(No Model.) 2 Sheets—Sheet 1.
J. L. BACHMAN.
Cultivator.
No. 240,571. Patented April 26, 1881.
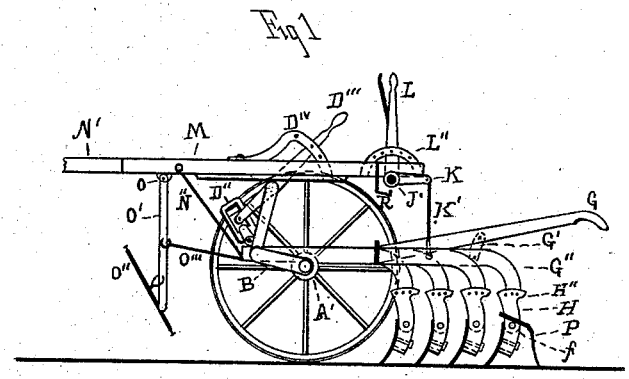
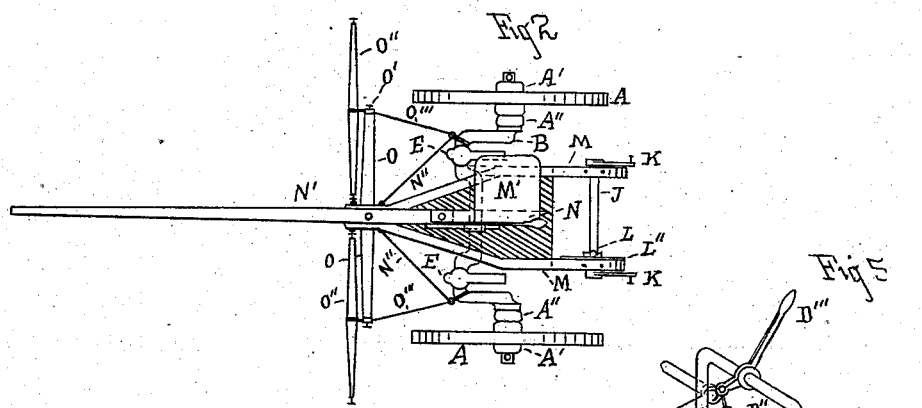
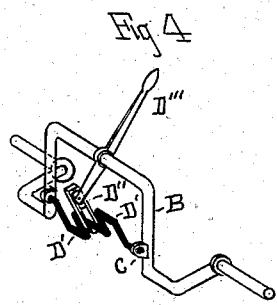
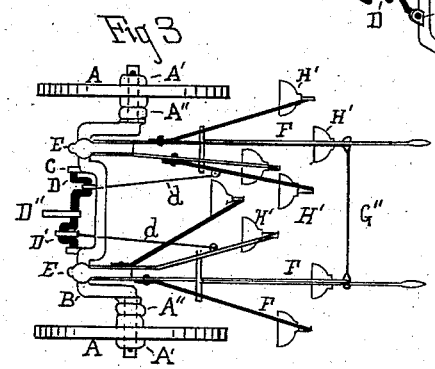
Witnesses
Frank O. Kinsey
Frank Schwantl
Inventor
Jonas L. Bachman
pr Thomas P. Kinsey
Atty (No Model.)
J. L. BACHMAN.
Cultivator.
No. 240,571.
2 Sheets—Sheet 2.
Patented April 26, 1881.
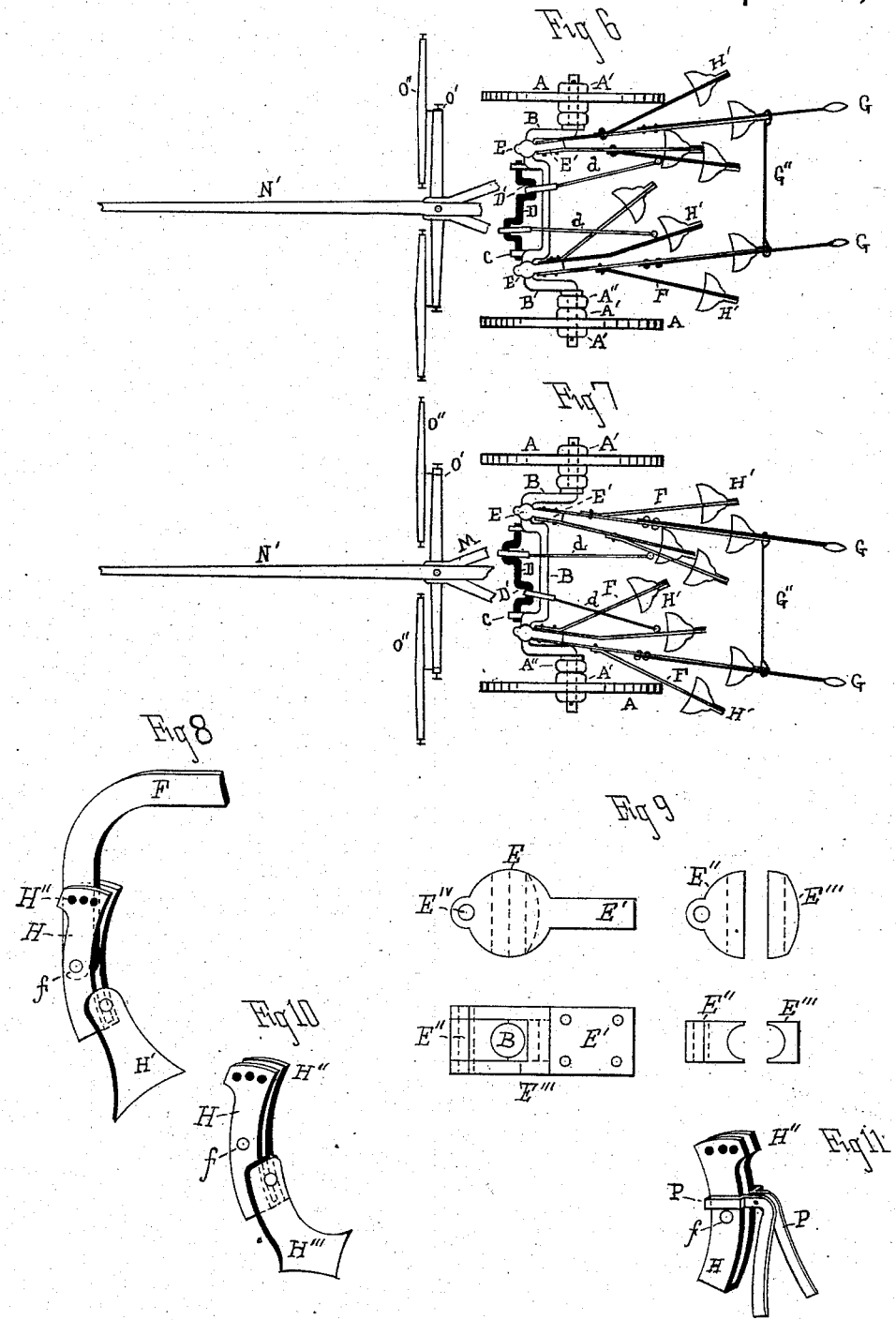

UNITED STATES PATENT OFFICE.

JONAS L. BACHMAN, OF STONY RUN, PENNSYLVANIA.

CULTIVATOR.

SPECIFICATION forming part of Letters Patent No. 240,571, dated April 26, 1881.

Application filed December 7, 1880. (No model.)

*To all whom it may concern:*

Be it known that I, JONAS L. BACHMAN, of Stony Run, county of Berks, State of Pennsylvania, have invented a new and useful Improvement in Sulky-Cultivators, adapted for general cultivation or for corn-culture, and arranged to be used either as a sulky or hand cultivator, of which the following is a specification.

My object has been to furnish an effective cultivator occupying a small space, easy to handle, and that can be turned around with comparative ease.

Referring to the drawings herewith, in which similar letters refer to similar parts, Figure 1, Sheet 1, is a side elevation with the wheel next the observer removed. Fig. 2, Sheet 1, is a plan showing the top frame. Fig. 3, Sheet 1, is a plan with the top frame removed; Fig. 4, Sheet 1, detail of axle-tree and sub-axle; Fig. 5, Sheet 1, alternative device for the horizontal shifting of the gang-plows; Fig. 6, Sheet 2, a plan as a right-hand hillsider; Fig. 7, Sheet 2, a plan as a left-hand hillsider; Fig. 8, Sheet 2, detail view of the shovel, showing its connection with the plow-beam by the vibrator-arm; Fig. 9, Sheet 2, detail of swivel-joint of plow-beam at the axle-tree bearing; Fig. 10, Sheet 2, elevation of shovel for corn-culture; Fig. 11, Sheet 2, detail of harrow-teeth attachment.

A represents the wheels, which are of the ordinary construction, except that the hubs A' are of metal.

A'' are washers, which are made from three inches to six inches in thickness, the axle-bearing being made of a corresponding length. This is done for the purpose of changing the width of track of the cultivator. As shown, the washers A'' are on the inside of the wheel-hubs, and the machine is at its maximum track. By changing the washers A'' to the front of the hubs A', the track is then at its minimum.

B is the axle-tree, which, after passing through the wheels, is bent horizontally at right angles therewith. At the distance of about twelve inches forward of the wheel it is again bent in a parallel line with the wheel-bearing, to form the bearing for the swivel-joint E of the cultivator-beams F, then bent at right angles vertically, and at the height necessary to receive the top frame again bent at right angles from the vertical across and underneath the top frame, as shown.

C are brackets secured to the vertical legs of the axle B, for the purpose of forming bearings for the sub-double-crank axle D. The two cranks D' D' are equally spaced each side of the center of the axle.

D'' is a slotted arm, secured on the body of the sub-axle D at its center.

D''' is a hand-lever, having its fulcrum on the top arch of the axle-tree B, traversing over a quadrant, D$^{IV}$, on the frame-piece N, the lower end being provided with a pin, on which is freely suspended a block working in the slot of the arm D''.

E is a swivel-joint coupling, having a tail, E', to which the beams F are attached, and a bifurcated head, between the jaws of which, loosely fitted and secured in place by a fulcrum-bolt, E$^{IV}$, are half-boxes E'' E''', bored to fit the axle-tree B, the box E''' having its back (next to the tail E') struck from the center of the fulcrum-bolt E$^{IV}$, the back of the recess of the jaws being struck from the same point. The front box, E'', has the shape of the jaws on plan, and when the boxes E'' E''' are in place on the axle-tree and within the jaws of the coupling E, the bolt E$^{IV}$, being inserted, locks the boxes in the same. This arrangement of joint allows a radial horizontal movement from the fulcrum-bolt E$^{IV}$, and a radial vertical movement from the boxes on the axle-tree B, which, thus vibrating, adjusts itself to all the inequalities of the ground over which it is drawn.

F F are wrought-iron cultivator-beams or curved drag-bars, of various lengths, as shown, secured to the tail of the coupling E, and terminating at the joint $f$ of the shovel-arm H. This arm is provided with a series of holes at the upper end, by means of which the entering angle of the shovel is defined. A corresponding hole in the beam serves for the insertion of a pin, which, in stony or stumpy ground, I have made of wood, so that in case of contact with an irresistible body the wooden pin breaks and the plow passes on unharmed.

G G are the handles, one to each set of cultivator-beams. They are braced to the beams F by the connection G'. A cross-rod, G'', connects the two sets of beams, which are thus handled by one man in hand cultivation.

$d\ d$ are connecting or shifting rods running from the double cranks D' back to beams F, and which serve, by pulling on one and shoving on the other, to swing the beams to the right or left of the center of traction, according as the lever D''' is moved over the quadrant D$^{IV}$.

J is a cross-shaft at the rear of the frame, having crank-arms K at each end, and working in bearings J', clamped to the under side of the side frames M. It is also provided with a hand-lever, L, having a spring-pawl provided with a pin at its lower end, which is arranged to push through the lever L into the corresponding holes in the quadrant L''.

K' are rods connecting each set of cultivator-beams with the cross-shaft J by the cranks K. The lever L, operating the cranks K, regulates the depth to which it is desired that the shovels H' shall enter the ground under cultivation.

M are the side and N the center pieces of the top frame of the cultivator.

N' is the pole, and M' the seat for the driver.

N'' are braces from the frame to the axletree B; O, the double-tree; O', a vertical hanger of the double-tree; O'', the single-trees, and O''' braces from the vertical hangers to the axletree B.

R R are side hooks, for the purpose of suspending the cultivator-frames F clear of the ground for transportation.

I prefer the arrangement of hand-lever and sliding block shown in Figs. 1 and 4; but the alternative device shown in Fig. 5 may be used in place thereof.

On level ground the action of my cultivator is not materially different from those now in use; but in cultivating rolling or hilly ground, by the arrangement of sub-axle D and lever D''' through the arm D'', cranks D', and connecting-rods d, the line of traction can be instantly changed while in motion, so as to cast the ground to the right or left, as desired. I think I am the first to give this desirable feature to a cultivator by one throw of a single hand-lever.

When the corn or grain under cultivation has attained such height that the sub-axle D would interfere with the corn, the sub-axle and rods d d are removed. The arch of the axletree B will then permit the use of the cultivator until the corn has attained growth sufficient to no longer need attention.

When used in the cultivation of corn, the shovels with broad noses H' are removed and shovels similar to those shown in Fig. 10 substituted therefor. The shovels are all adjustable on the arm H, so that their penetration can be regulated independent of the cross-shaft J, cranks K, and lever L. I also reduce the number of shovels to six—or three on each plow—when cultivating corn, removing the two shovels next each other on the inside of each set. The suspension-rods K' and the horizontal connecting-rod G'' are also removed when there is no obstruction left to interfere with passing over the growing corn.

To give a more effective tilth to the ground, break or disintegrate the lumps, and leave a smooth and even surface after the cultivator has passed, I attach, just above the swivel-pin f, and with the pulverizing tines or teeth in the rear of the shovels H', to the swiveling-arm H the removable double-armed harrow-teeth P, constructed of a bar of iron or steel bent to form an open eye that will pass over the arm H, then bent at or near a right angle with the eye, as shown in Fig. 6, and secure them thereto by a wooden break-pin, for the purpose, as is customary, of preventing breakage of the machine by permanent obstructions.

The object of the horizontal bend in the axletree forward, as shown, is for the purpose of throwing the draft of the plows more in advance of the wheels than is usual, that the cultivator may be more compact and easily turned in a small compass.

What I claim, and for which I desire to secure Letters Patent of the United States, is as follows, to wit:

1. A cultivator axle-tree, B, having a horizontal right-angle bend forward of and next to the wheels, a second bend, also at right angles, and horizontal, to form the bearings for the plow-couplings E, with vertical right-angle bends from said bearings, terminating with final right-angle bends at the desired height under the top frame, and provided with bearings C C for the sub-axle D, the axle-tree being continuous throughout, and the bending similar from both sides, as shown, and for the purpose substantially as described.

2. The sub-axle D, provided with the double opposite cranks, D' D', and slotted arm D'', in combination with the axle-tree B by the bearings C, with the plow-beams F by the connecting-rods d d, and with the hand-lever D''' by a pin and sliding block working in the slot of the arm D'', constructed and arranged for the purpose shown and specified.

3. The axle B, frame M N, rock-shaft J, arms K, lever L, plow-beams F, rods d, and sub-axle D, substantially as shown and described.

4. The coupling E, having laterally-bifurcated head, and the bearing-boxes E'' E''' at front and rear of axle, the back of box E''' and the wall of the bifurcated head being struck with a radius from the bolt E$^{IV}$, in combination with axle B and plow-beams F, substantially as shown and described.

5. The hand-lever D''', having its fulcrum on the axle-tree B, in combination with the sub-axle D, the sliding block working in the arm D'', and with the quadrant D$^{IV}$ on the top frame, substantially as shown, and for the purpose specified.

6. The pulverizing double-tined harrows P, constructed and adapted to be used in combination with the shovels H', as specified, and substantially as shown.

JONAS L. BACHMAN.

Witnesses:
H. D. GREEN,
J. H. ROTHERMEL.